United States Patent
Watanabe et al.

(10) Patent No.: US 6,859,837 B2
(45) Date of Patent: Feb. 22, 2005

(54) SERVICE INFORMATION PROVIDING METHOD, SERVICE INFORMATION PROVIDING APPARATUS AND SYSTEM

(75) Inventors: Minoru Watanabe, Konosu (JP); Seizo Motai, Chiba (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 726 days.

(21) Appl. No.: 09/815,349

(22) Filed: Mar. 23, 2001

(65) Prior Publication Data

US 2001/0042125 A1 Nov. 15, 2001

(30) Foreign Application Priority Data

| May 9, 2000 | (JP) | .................................. 2000-136127 |
| Mar. 2, 2001 | (JP) | .................................. 2001-058515 |

(51) Int. Cl.[7] .............................................. G06F 15/16
(52) U.S. Cl. .................................... 709/229; 709/219
(58) Field of Search ................................ 709/203, 217, 709/219, 227, 229

(56) References Cited

U.S. PATENT DOCUMENTS

| 5,060,153 A | 10/1991 | Nakagawa |
| 5,673,373 A | 9/1997 | Nosaki et al. |
| 5,754,939 A * | 5/1998 | Herz et al. ................ 455/3.04 |
| 5,999,908 A | 12/1999 | Abelow |
| 6,070,148 A | 5/2000 | Mori et al. |
| 6,236,991 B1 * | 5/2001 | Frauenhofer et al. .......... 707/6 |
| 6,289,348 B1 * | 9/2001 | Richard et al. ............... 707/10 |
| 6,594,682 B2 * | 7/2003 | Peterson et al. ............ 718/102 |
| 6,606,663 B1 * | 8/2003 | Liao et al. .................. 709/229 |
| 6,647,425 B1 * | 11/2003 | Chaddha ..................... 709/233 |

FOREIGN PATENT DOCUMENTS

| EP | 0 718 786 A1 | 6/1996 |
| JP | 8-107504 | 4/1996 |
| JP | 9-331417 | 12/1997 |
| JP | 10-269284 | 10/1998 |
| JP | 11-328293 | 11/1999 |
| JP | 2000-270150 | 9/2000 |
| WO | WO 99/38117 | 7/1999 |

* cited by examiner

Primary Examiner—Krisna Lim
(74) Attorney, Agent, or Firm—Pillsbury Winthrop LLP

(57) ABSTRACT

A service information providing method of providing various pieces of service information stored in a host apparatus to a terminal apparatus connected to the host apparatus by a wire or wireless, includes the steps of registering identification information related to the terminal apparatus for receiving the service information in the host apparatus and an IC card freely detachable from a terminal apparatus, confirming whether the registered electronic device is set in the terminal apparatus represented by the registered identification information, and when it is confirmed in the confirmation step that the electronic device is set in the terminal apparatus, providing the service information stored in the host apparatus to the terminal apparatus represented by the registered identification information.

16 Claims, 19 Drawing Sheets

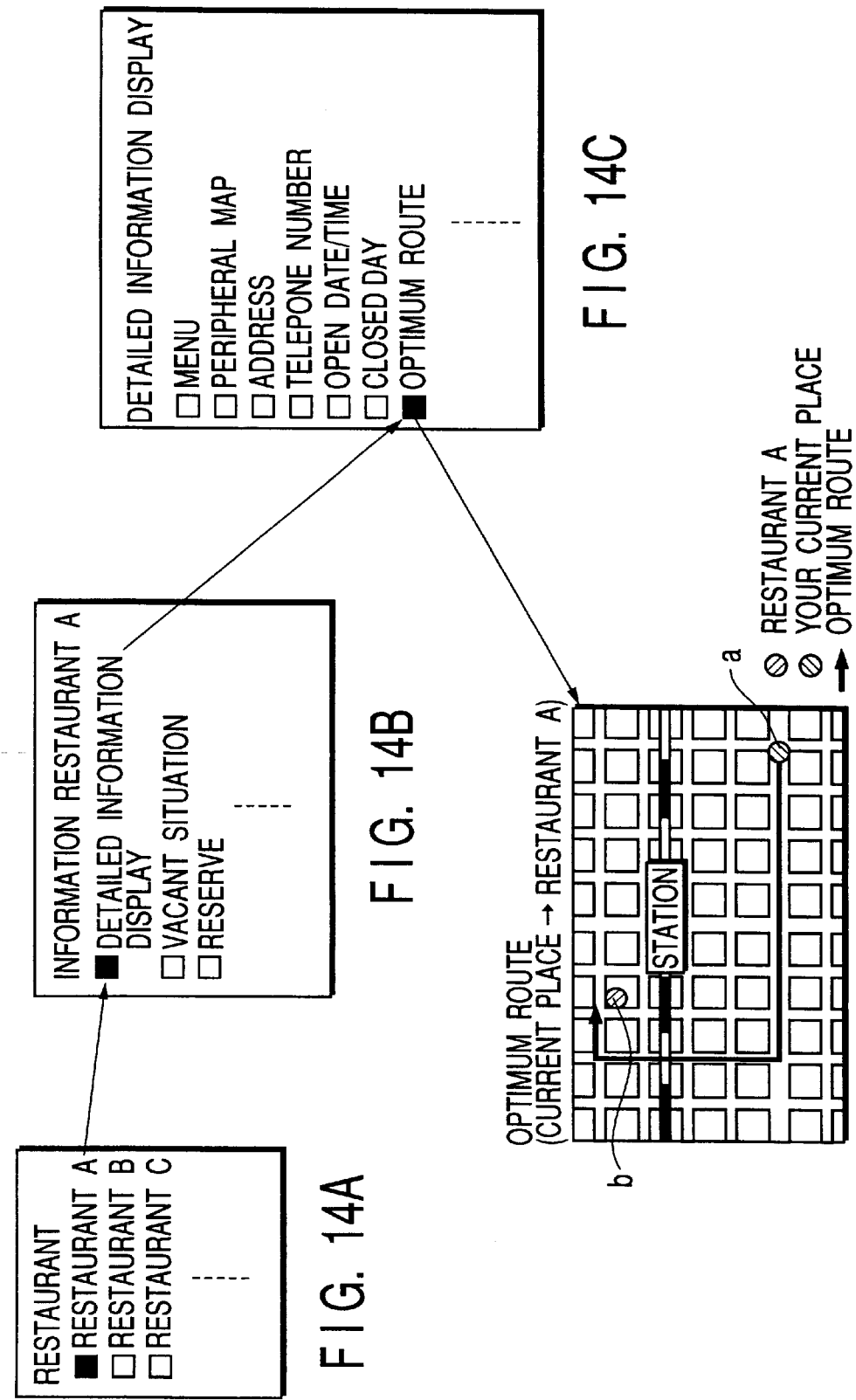

SERVICE INFORMATION PROVIDING METHOD, SERVICE INFORMATION PROVIDING APPARATUS AND SYSTEM

CROSS-REFERENCE TO RELATED APPLICATIONS

This application is based upon and claims the benefit of priority from the prior Japanese Patent Applications No. 2000-136127, filed May 9, 2000; and No. 2001-058515, filed Mar. 2, 2001, the entire contents of both of which are incorporated herein by reference.

BACKGROUND OF THE INVENTION

The present invention relates to a service information providing method and system for providing useful service information really wanted by a user using a portable electronic device that is the electronics apparatus easy to get on and off to the terminal such as a smart card (hereinafter the smart card is called IC card) or memory card and a terminal apparatus such as a car terminal or portable telephone. And, the present invention relates to the service information providing apparatus for providing the service information described above.

In recent years, personal computers and networks represented by personal computer communication or the Internet are spreading not only in offices but also at home. Along with this spread, various services are provided. Needless to say about most offices, even personal shops and general households have homepages and put out information, so the networks are flooded with an enormous quantity of information.

On the other hand, as a terminal apparatus used to browse the information, not only personal computers in offices and homes, so-called Internet cafés (cafés where the Internet can be used), street terminal apparatuses represented by kiosk terminal apparatuses, and dedicated terminal apparatuses on which offices provide unique services are being widely used.

For cars, recently, car navigation systems are becoming popular, car terminals (mobile terminal apparatuses) aiming at ETC (Electronic Toll Collection system) or ITS (Intelligent Transport Systems) in the future are being developed, and computerization and networking for cars are starting.

For communication that has an important role in networks, the communication infrastructure is being established along with, e.g., the explosive proliferation of portable telephones, and an increase in communication speed of the conventional telephone network represented by the ISDN. Some portable telephones have not only a telephone function but also portable terminal apparatus functions for e-mail and the Internet.

As described above, transmission and reception of information are done in various forms. However, there are neither sufficient mechanism which allows a user to obtain only wanted service information anytime and anywhere nor a sufficient systematic service mechanism which allows a user to effectively use the service information.

In relation to these techniques, techniques disclosed in Jpn. Pat. Appln. KOKAI Publication Nos. 11-65434 and 12-99442 are known.

In the technique disclosed in Jpn. Pat. Appln. KOKAI Publication No. 11-65434, an information providing apparatus provides, to an onboard mobile terminal in a car, not only information designated by the user but also advertisement information according to the position of the mobile terminal.

In the technique disclosed in Jpn. Pat. Appln. KOKAI Publication No. 12-99442, advise information related to the user's action is provided to the user or his/her family in accordance with position information transmitted from a terminal carried by the user.

Conventionally, since an enormous amount of information are put out on the Internet, it is difficult to find information truly required by the user. In addition, since information reception from the Internet is mostly done using a personal computer permanently connected to the network in an office or home, desired information cannot be acquired at a place where the personal computer cannot be used (at a place except the office or home, during walking, and in vehicles).

Some cars have car navigation systems. However, information provided by such a car terminal is fixed information registered in a storage medium such as a CD-ROM in advance. Even when latest information is provided from the information providing server through the communication channel, this information service is one-way transmission from the information providing side, and all pieces of information provided are not always required by the user. Furthermore, operation of receiving detailed information by the car terminal is cumbersome and not effective.

Information wanted by a user means really useful information which is narrowed down in accordance with a specific place and date/time. For example, when a sightseeing tourist using a car is going to make a first visit to a place and take a meal in that region, the categories of meals such as Japanese, Western, and Chinese meals and the date/time of the meal are important keys. It is very difficult to acquire desired information from an enormous amount of information without using the keys to narrow down the information.

A sightseeing tourist often wants to visit various places in a short time. However, at a first visit place or unfamiliar place, a certain period of time is required to extract such desired information. It is also difficult to select an efficient route to go to a desired shop by the car. In addition, a desired restaurant may be closed because of a regular holiday although the tourist has managed to arrive at the restaurant. This also applies to a walking tour.

Furthermore, the techniques disclosed in Jpn. Pat. Appln. KOKAI Publication Nos. 11-65434 and 12-99442 are one-way transmission from the service information providing side. In this case as well, all pieces of information provided are not always required by the user, and the same problems as described above are posed.

BRIEF SUMMARY OF THE INVENTION

It is an object of the present invention to provide a service information providing method a service information providing apparatus and system capable of timely providing useful service information really wanted by a user such that both the service receiving side and the service providing side can have advantages, i.e., the service receiving side can obtain effective information, and the service providing side can effectively provide the information.

It is another object of the present invention to provide a service information providing method and system in which a user registers in advance desired service information and date/time in both the service providing side and the user's portable electronic device and can receive desired service information at a designated place registered in the portable electronic device.

It is still another object of the present invention to provide a service information providing method a service information providing apparatus and system capable of providing consistent services to the user.

According to the present invention, there is provided a service information providing system for providing various pieces of service information stored in a host apparatus to a terminal apparatus connected to the host apparatus by a wire or wireless, comprising input means for inputting identification information related to a terminal apparatus for receiving the service information, registration means for registering the identification information input by the input means in the host apparatus and an electronic device freely detachable from the terminal apparatus, determination means for determining whether the registered electronic device is set in the terminal apparatus represented by the identification information registered by the registration means, and providing means for, when the determination means determines that the electronic device is set in the terminal apparatus, providing the service information stored in the host apparatus to the terminal apparatus represented by the registered identification information.

In the service information providing system according to the present invention having the above-described arrangement, the identification information is input to the detachable electronic device such as an IC card by the input means such as a personal computer, the IC card is inserted to the terminal apparatus, and the identification information is registered in the host apparatus such as an information providing server. After that, when it is confirmed from the information providing server that the IC card is inserted to the target device such as a car terminal, necessary service information is provided to the target device such as the car terminal. With this system configuration, for example, when information such as a tour destination is input from the personal computer at home and the IC card is inserted to the target device such as a car terminal, necessary map information and travel information are provided from the information providing server. Hence, a service information providing system can be provided, in which all input operation is done using the personal computer at home. During a tour when information is necessary, the car terminal in the car can receive desired information from the information providing server by simple operation without performing cumbersome operation such as character input.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 14A to 14D are views showing display windows on a car terminal;

DETAILED DESCRIPTION OF THE INVENTION

The embodiment of the present invention will be described below with reference to the accompanying drawings.

Figure 1:
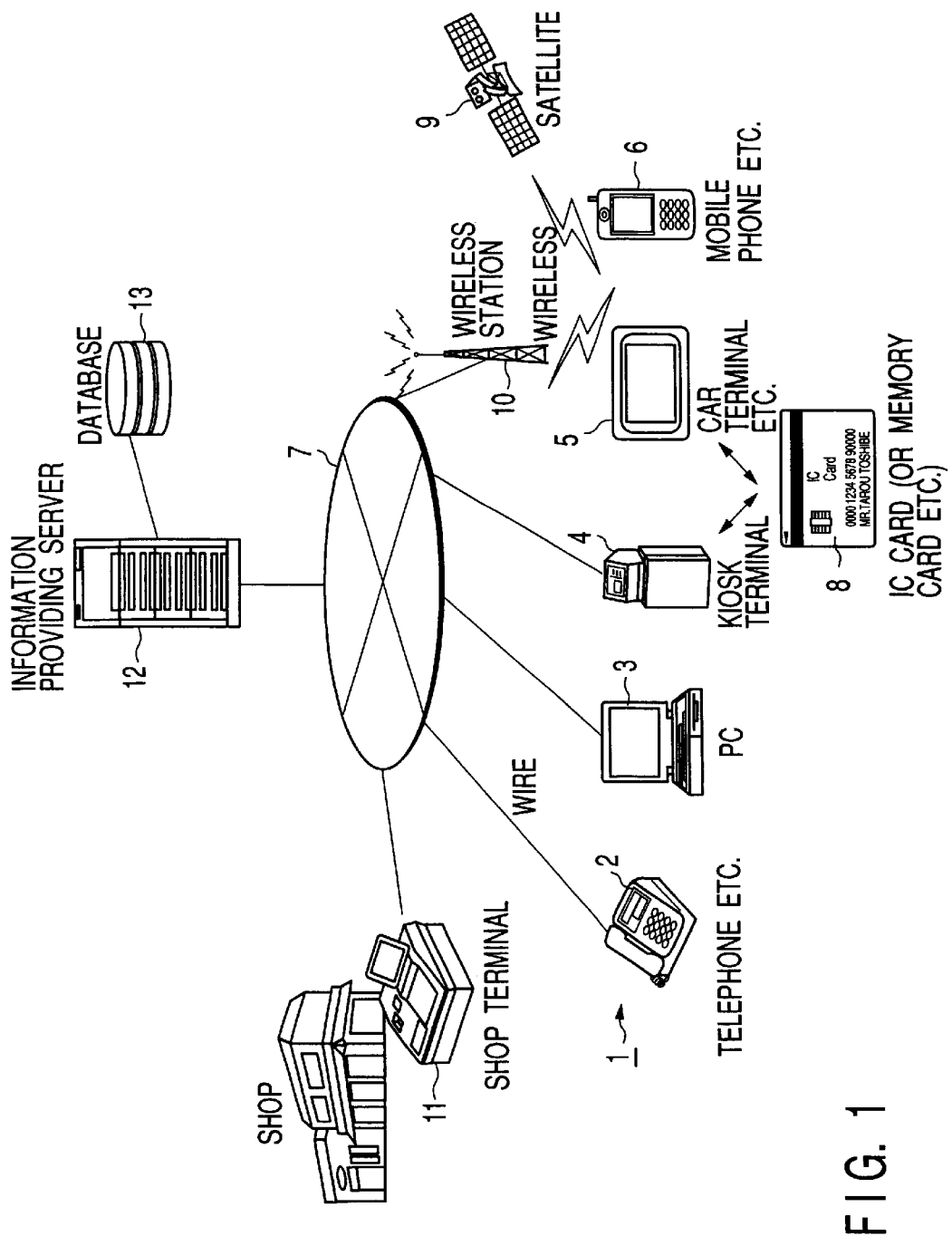
FIG. 1 is a view schematically showing the arrangement of a service information providing system according to an embodiment of the present invention.

FIG. 1 is a view schematically showing the arrangement of a service information providing system according to the embodiment. Referring to FIG. 1, various kinds of terminal apparatuses 1 comprise, e.g., a cable telephone set 2 in an office or home, a personal computer 3 in an office or home, a street (kiosk) terminal apparatus 4 installed in a service area of a highway, a car terminal (mobile terminal apparatus) 5 installed in a car, and a mobile phone 6 held by a person. The cable telephone set 2, personal computer 3, and street terminal apparatus 4 are connected to a communication network 7 through cables.

The wired phone 2 and the personal computer 3 in the office or home has a card reader/writer function for processing a compact IC card (or memory card) 8 as a portable electronic device.

The street terminal apparatus 4 installed in a service area of a highway can, e.g., provide various kinds of service information to a user and has a card reader/writer function for processing the IC card 8, an input function (keyboard) for inputting various kinds of information, and a display function (display) for displaying various kinds of information.

The car terminal 5 installed in a car has a navigation function using a GPS for acquiring current position information using a signal from a satellite 9, a radio communication function for executing radio communication with a nearest wireless station 10 connected to the communication network 7 through a cable, a card reader/writer function for processing the IC card 8, an input function (keyboard) for inputting various kinds of information, and a display function (display) for displaying various kinds of information including a map.

The mobile phone 6 performs radio communication with the nearest wireless station 10 connected to the communication network 7 and can, e.g., provide various kinds of service information to the user. The mobile phone 6 has a card reader/writer function for processing the IC card 8 (including SIM card), an input function (keyboard) for inputting various kinds of information, and a display function (display) for displaying various kinds of information.

The IC card 8 incorporates, e.g., an IC chip formed from semiconductor memories and a CPU for controlling them and stores various kinds of information such as a condition and reception place for information wanted by the user (to be described later).

In this embodiment, a description has been made using the compact IC card 8 as a portable electronic device. However, the present invention is not limited to this, and any other device having a different outer appearance can be used.

A shop terminal apparatus 11 installed in various shops (facilities used) has a reserve confirmation function, a card payment function, and a card reader/writer function for processing the IC card 8 and is connected to the communication network 7 through a cable.

An information providing server 12 as a host unit is connected to the communication network 7. The information providing server 12 provides various kinds of service information on the basis of a condition registered in advance (to be described later in detail) and has a database 13 which stores various kinds of service information.

As described above, the various terminal apparatuses 1 and shop terminal apparatus 11 are online-connected to the information providing server 12 by wire or wireless through the communication network 7 such that online processing therebetween can be executed.

Figure 20:
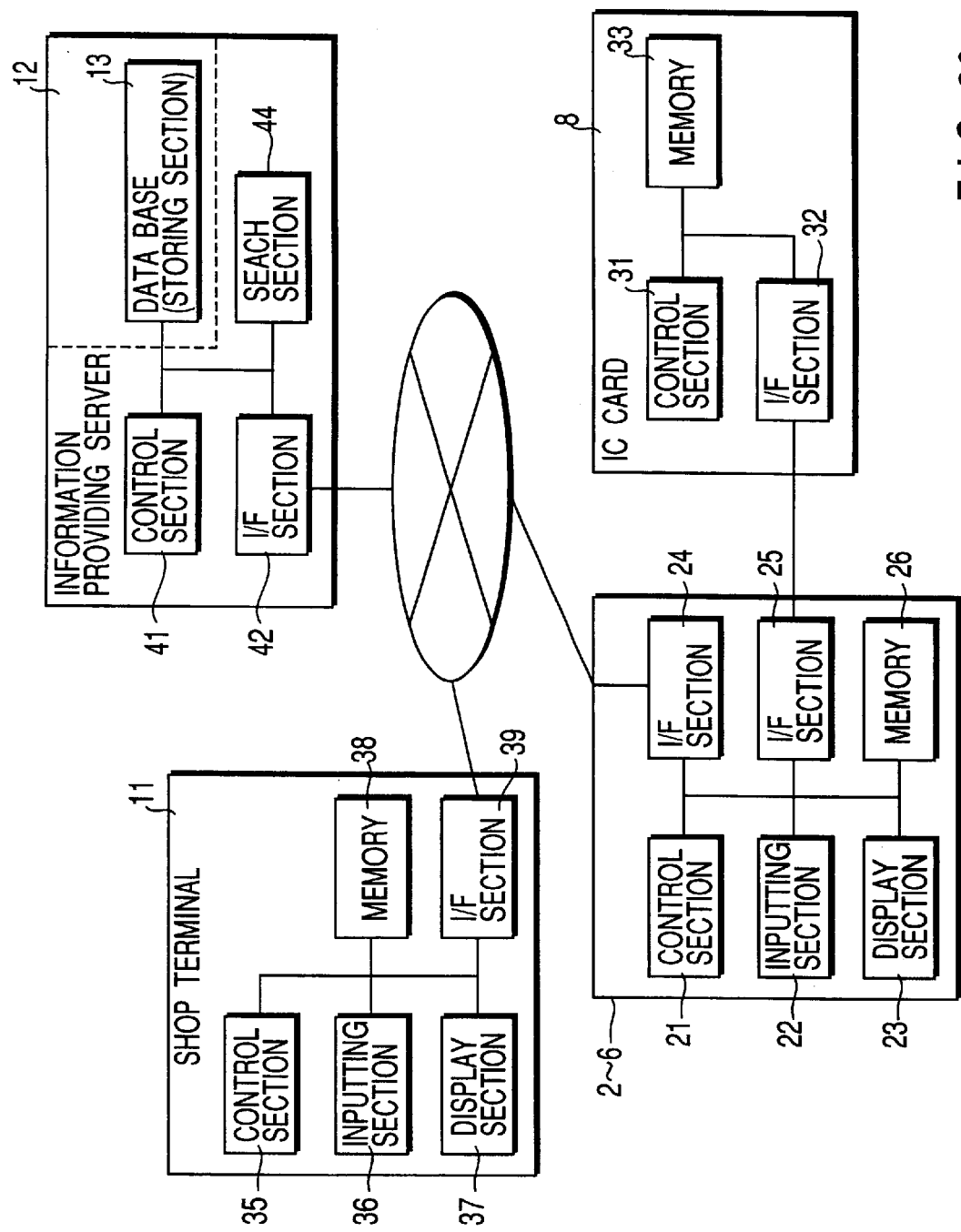
FIG. 20 is a block diagram showing the units that constitute the system according to the present invention.

FIG. 20 is a block diagram showing the units that mainly constitute the system according to the present invention. Referring to FIG. 20, the IC card 8 comprises a memory 33 for storing various data represented by the ID information of the IC card, an I/F section 32 for transmitting/receiving data to/from the terminal apparatuses 2 to 6 in a contact or noncontact state, and a control section 31 for controlling the whole card.

Each of the terminal apparatuses 2 to 6 comprises an I/F section (reader writer section) 24 for transmitting/receiving data to/from the IC card 8 in a contact or noncontact state, an I/F section 26 for transmitting/receiving data to/from the information providing server 12 by radio or a cable, a memory 25 for storing various data, an input section 22 formed from a ten-key pad or the like through which information is externally input by the user, a display section 23 for displaying various pieces of information or information input from the input means, and a control section 21 for controlling the whole components. Each of the terminal apparatuses 2 to 6 has an internal or externally attached reader/writer (not shown) for the IC card 8 and can receive the IC card 8.

The shop terminal 11 comprises an I/F section 39 for transmitting/receiving data to/from an external apparatus such as the information providing server by radio or a cable, a memory 38 for storing various pieces of information, an input section 36 formed from a ten-key pad or the like through which information is externally input, a display section 37 for displaying various pieces of information or information input from the input means, and a control section 35 for controlling the whole terminal.

The information providing server 12 comprises an I/F section 42 for transmitting/receiving data to/from an external apparatus by radio or a cable, a database section (storage section) 13 for storing various pieces of service information, registered condition information, or reception place information, a search section 44 for executing service information search on the basis of condition information stored in the database section, and a control section 41 for controlling the whole server.

Figure 2:
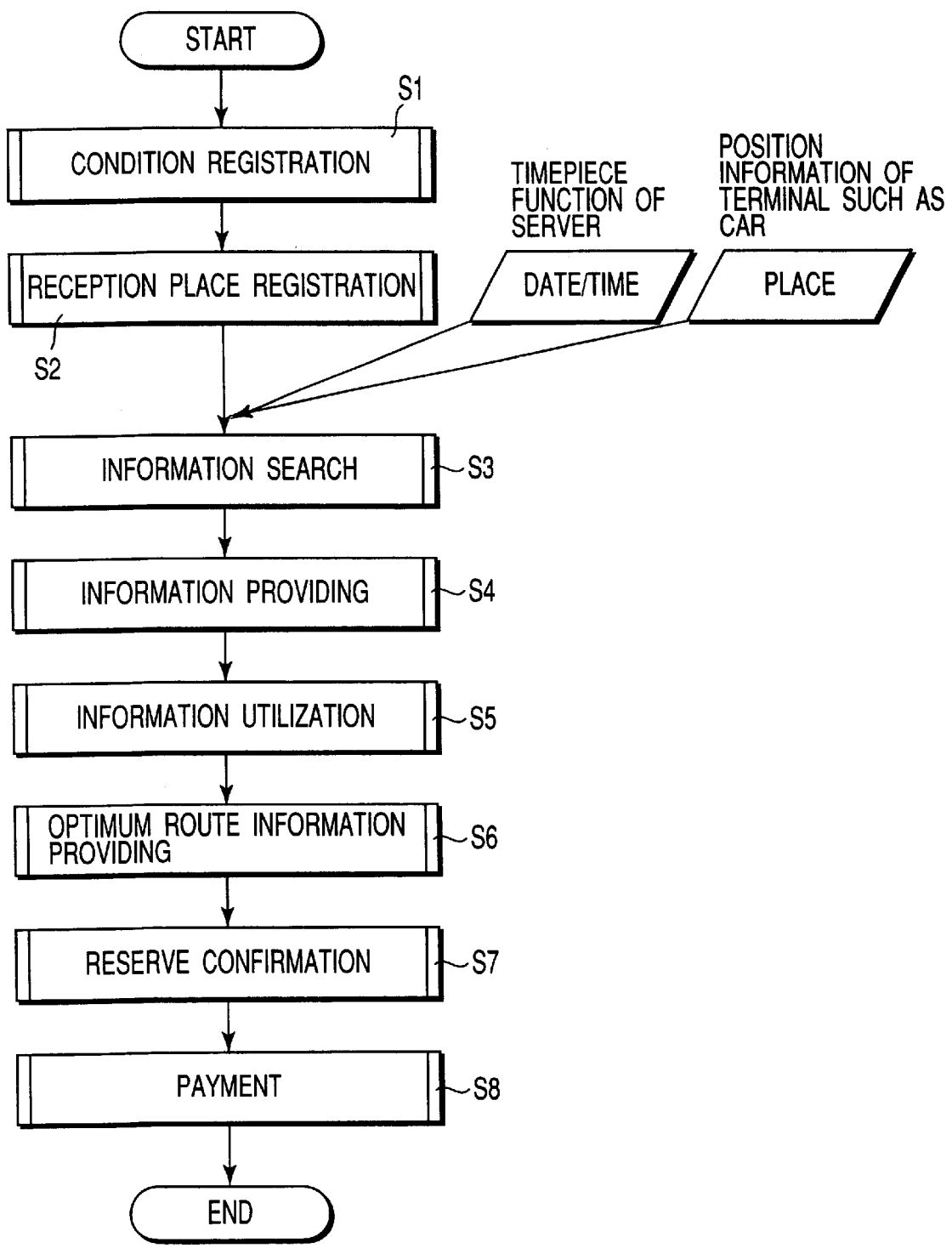
FIG. 2 is a flow chart for explaining the overall processing flow.

The overall processing flow in this arrangement will be described next with reference to the flow chart shown in FIG. 2. In step S1, conditions for service information wanted by the user are input using one of various the terminal apparatus 1, and the contents are registered in the IC card 8 and also in the information providing server 12.

The various terminal apparatuses 1 and information providing server 12 are online-connected through the communication network 7 to allow online processing, as described above. If they are not online-connected, offline processing can be executed. In this case, conditions for service information wanted by the user are registered in the IC card 8 using one of the various terminal apparatuses 1 and, after that, registered in the information providing server 12 when the terminal apparatus 1 is online-connected.

In step S2, a place where the user wants to actually receive the designated service information is input using one of the various terminal apparatuses 1, and the contents are registered in the IC card 8 and also in the information providing server 12. When the registration processing until this step is ended, preparation for reception of the designated service information at the designated place (including a time during movement) is done.

In steps S3 and S4, the information providing server 12 searches (collects) and provides the service information based on the registered conditions. More specifically, when certain service information matches the registered conditions, the designated service information is transmitted to a terminal apparatus at the reception place registered in advance in the designated time zone.

For example, when such conditions are registered that "information of Chinese restaurants should be provided to the car terminal 5 at 12:00 to 13:00", the car terminal 5 periodically contacts the information providing server 12 using its radio communication function whereby the information providing server 12 forms a list of Chinese restaurants in the region where the user will pass through in the designated time zone and transmits the information to the car terminal 5. The information providing server 12 periodically updates the information of the list, so really useful service information can be obtained using the date/time information in consideration of the closed day or close time of each restaurant.

In a terminal apparatus which is used by many unspecified persons and cannot receive any information in real time, e.g., the street terminal apparatus 4 installed in a service area of a highway, service information is stored. The service information can be extracted using the IC card 8 as a key.

In step S5, the user uses the information provided in the above way. More specifically, service menu information is presented from the information providing server 12, and the user selects an information utilization means from the menu. In the above example, a Chinese meal is reserved and ordered by acquiring a menu from the information providing server 12 in advance.

In step S6, when a user who is moving by a car or train or walking uses various facilities on the basis of the obtained service information, an optimum route to a target facility and information of the positional relationship between the user and that facility are provided.

In steps S7 and S8, the reservation is confirmed, and the use charge is paid. More specifically, when the user arrives at the reserved use facility, the reserve contents are confirmed at the use facility using the IC card 8 and shop terminal apparatus 11. When the IC card 8 has a payment function, the use charge is paid using the IC card 8.

The overall processing flow shown in FIG. 2 will be described next on the basis of the arrangement shown in FIG. 20. In step S1, conditions for service information wanted by the user are input using the input section 22 of the various terminal apparatuses 1 (2 to 6), and the contents are registered in the IC card 8 using the I/F section 26 and transmitted to the information providing server 12 through the I/F section 24.

In step S2, the place where the user wants to actually receive the designated service information is input using the input section 22 of the various terminal apparatuses 1 (2 to 6), and the contents are registered in the IC card 8 using the I/F section 26 and transmitted to the information providing server 12 through the I/F section 24. The control section 41 of the information providing server 12 stores, in the database 13, the contents received through the I/F section 42. When the registration processing until this step is ended, preparation for reception of the designated service information at the designated place (including a time during movement) is done.

In steps S3 and S4, the control section 41 of the information providing server 12 searches (collects) the service information using the search section 44 on the basis of the conditions registered in the database 13. As a result of search by the search section 44, when information that matches the registered conditions of the wanted service information is found, the control section 41 transmits, through the I/F section 42, the designated service information to a terminal apparatus at the reception place registered in advance in the designated time zone.

For example, when such conditions are registered in the database 13 of the information providing server 12 that "information of Chinese restaurants should be provided to the car terminal 5 at 12:00 to 13:00", the control section 41 of the information providing server 12 periodically contacts the information providing server 12 using the radio communication function (I/F section 24) of the car terminal 5 as needed whereby the control section 41 forms, using the search section 44, a list of Chinese restaurants in the region where the user will pass through in the designated time zone and transmits the information to the car terminal 5 through the I/F section 42. In the information providing server 12, the pieces of information of the list are periodically updated, so really useful service information can be obtained using the date/time information in consideration of the closed day or close time of each restaurant.

The control section 21 of a terminal apparatus which is used by many unspecified persons and cannot receive any information in real time, e.g., the street terminal apparatus 4 installed in a service area of a highway stores the service information in the memory 25 or the like. The service information can be extracted from the memory 25 using, as a key, a signal from the I/F section 26 which communicates with the IC card 8.

In step S5, the user uses the information provided from the I/F section 24 to the I/F section 32 in the above way. More specifically, the control section 21 of the terminal apparatus 1 (2 to 6) displays, on the display section 23, service menu information which is received from the information providing server 12 through the I/F section 32 and selects an information utilization means from the displayed menu using the input section 22.

In step S6, when a user who is moving by a car or train or walking uses various facilities on the basis of the obtained service information, the information providing server 12 transmits, to the terminal apparatus 1 through the I/F section 42, information such as an optimum route to the target facility and the positional relationship between the user and that facility using the information stored in the database 13.

In steps S7 and S8, the reservation is confirmed, and the use charge is paid. More specifically, when the user arrives at the reserved use facility, the reserve contents stored in the memories 38 and 25 are confirmed at the use facility using the IC card 8 and shop terminal apparatus 11. When the IC card 8 has a payment function, the control section 35 of the shop terminal apparatus 11 pays the use charge using the IC card 8.

Each step will be described below in detail.

Condition registration in step S1 will be described first. Condition registration using the personal computer 3 at home as one of the various terminal apparatuses 1 will be described. This also applies to processing using another terminal apparatus.

First, online processing will be described with reference to FIG. 3 that illustrates devices used and the flow chart shown in FIG. 4.

In step S11, the user sets the IC card 8 in the personal computer 3. When the IC card 8 is set, the personal computer 3 reads out, from the IC card 8, an ID number as personal identification information stored in the IC card 8 and transmits the readout ID number to the information providing server 12. If online processing is impossible because, e.g., the information providing server 12 is not in operation (S12), the flow advances to offline processing (to be described later).

When online processing is possible (S12), the information providing server 12 receives the ID number from the personal computer 3 and performs personal authentication on the basis of, e.g., whether the ID number is registered, i.e., the user is registered as a member who can use the system (S13).

The user inputs, through the personal computer 3, conditions for service information wanted by the user, e.g., a use region where the service information is to be used, a use facility such as an amusement park, zoo, and restaurant, a providing time zone when the user will receive the service information, and a use time zone when the user will use the facility (S14).

Figures 3, 5:
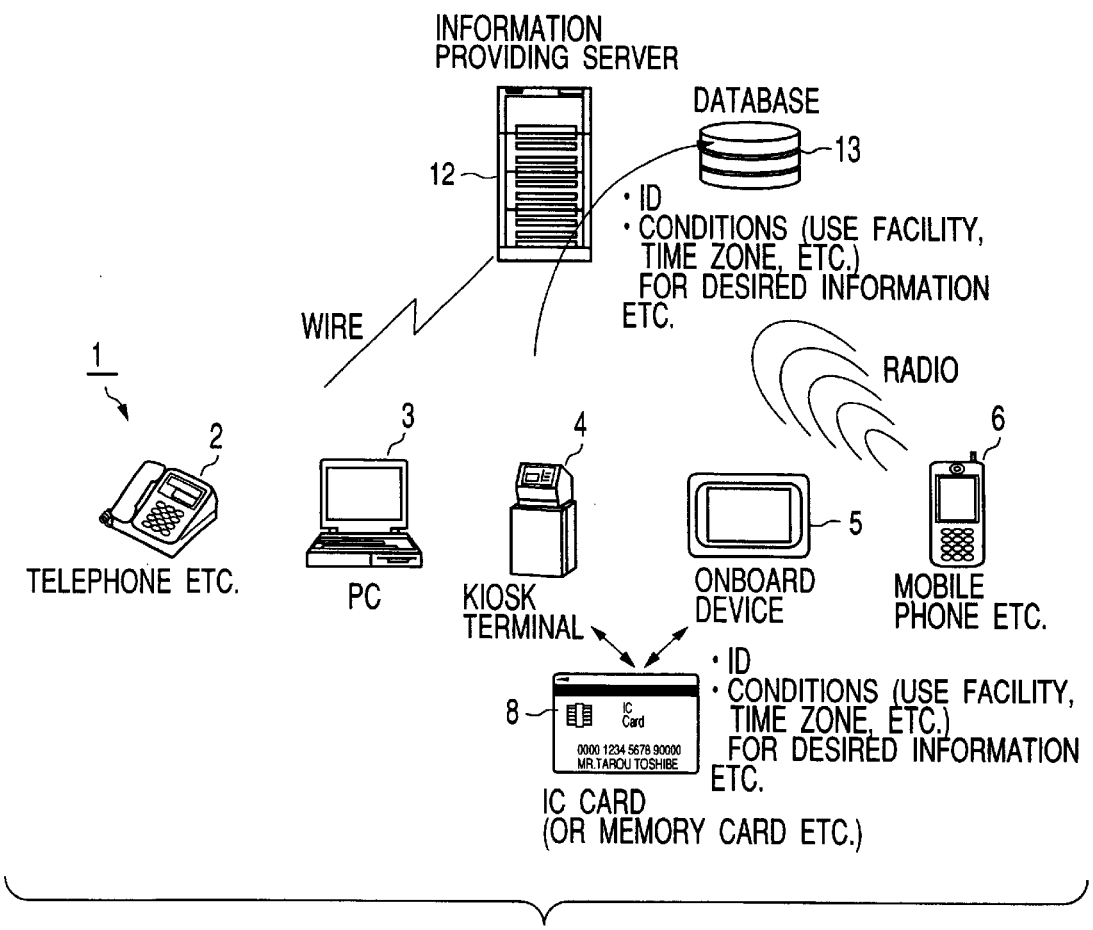
FIG. 3 is a view showing devices used for condition registration by online processing.
FIG. 5 is a view showing information stored in an IC card.

The personal computer 3 transmits the pieces of input condition information to the IC card 8 set therein (S15) and stores the information in, e.g., the IC card 8 (S16), as shown in FIG. 5, and also transmits the information to the information providing server 12 (S17).

Figures 6, 7:
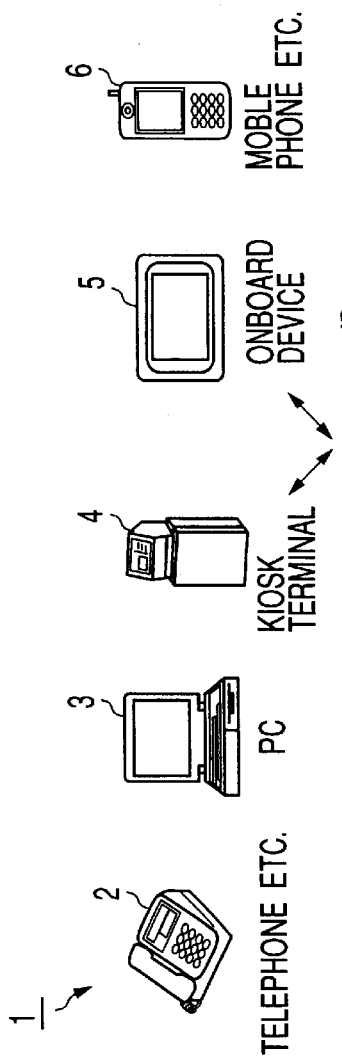
FIG. 6 is a view showing information stored in an information providing server.
FIG. 7 is a view showing devices used for condition registration by online processing.

The information providing server 12 stores the pieces of condition information from the personal computer 3 in, e.g., the database 13 (S18), as shown in FIG. 6, and resets the offline processing flag in the IC card 8 through the personal computer 3 (S19).

The offline processing flag represents whether the condition registration has been done by online processing or offline processing. A reset state represents that online processing has been executed. A set state represents that offline processing has been executed. When this offline processing flag is referred to, it can be discriminated whether the condition registration is done by online processing or offline processing.

The condition registration by online processing is ended in the above way.

Figure 21:
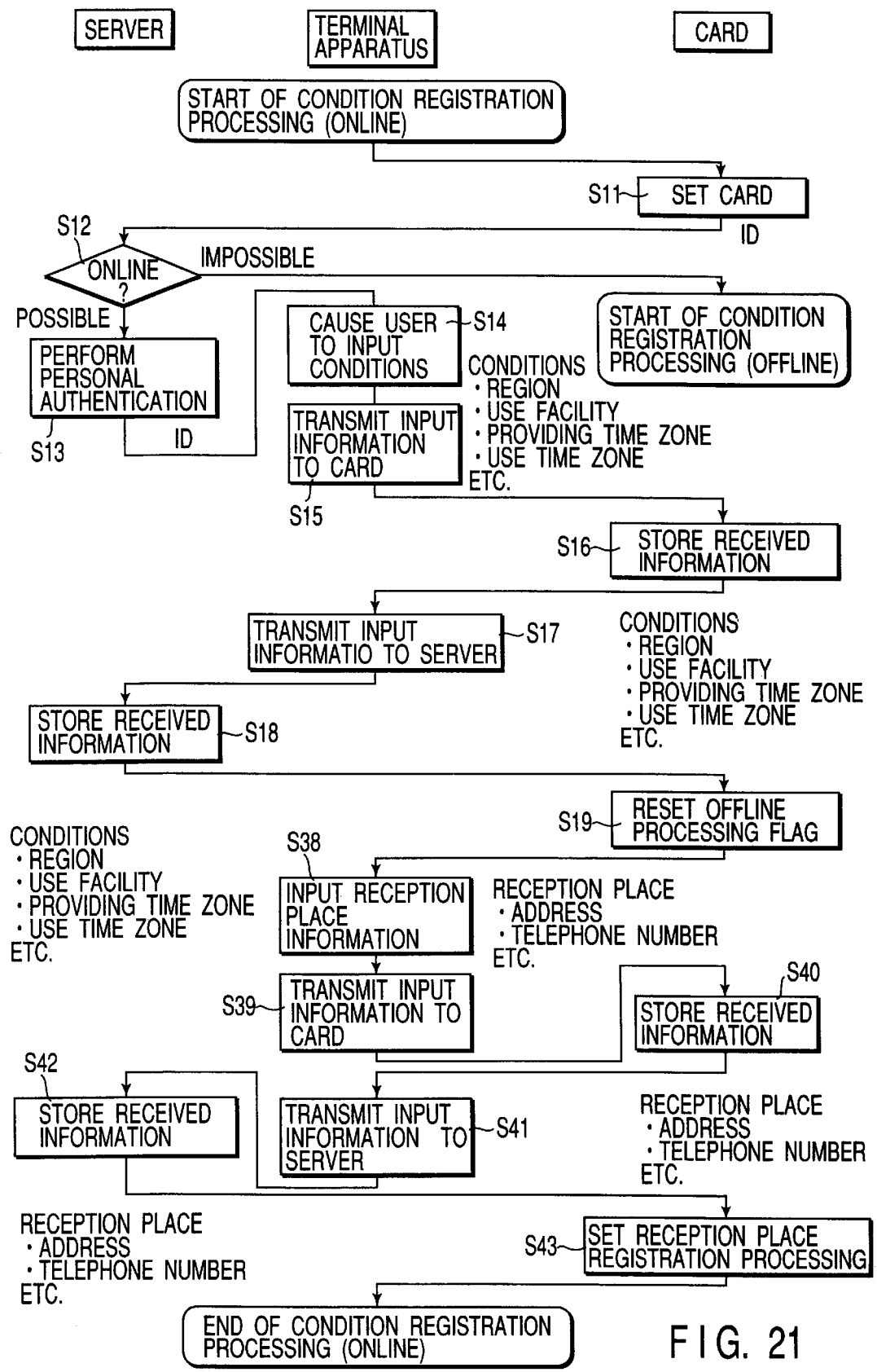
FIG. 21 is a flow chart for explaining a process of registering a reception place continuing to the condition registration online process.
Figure 22:
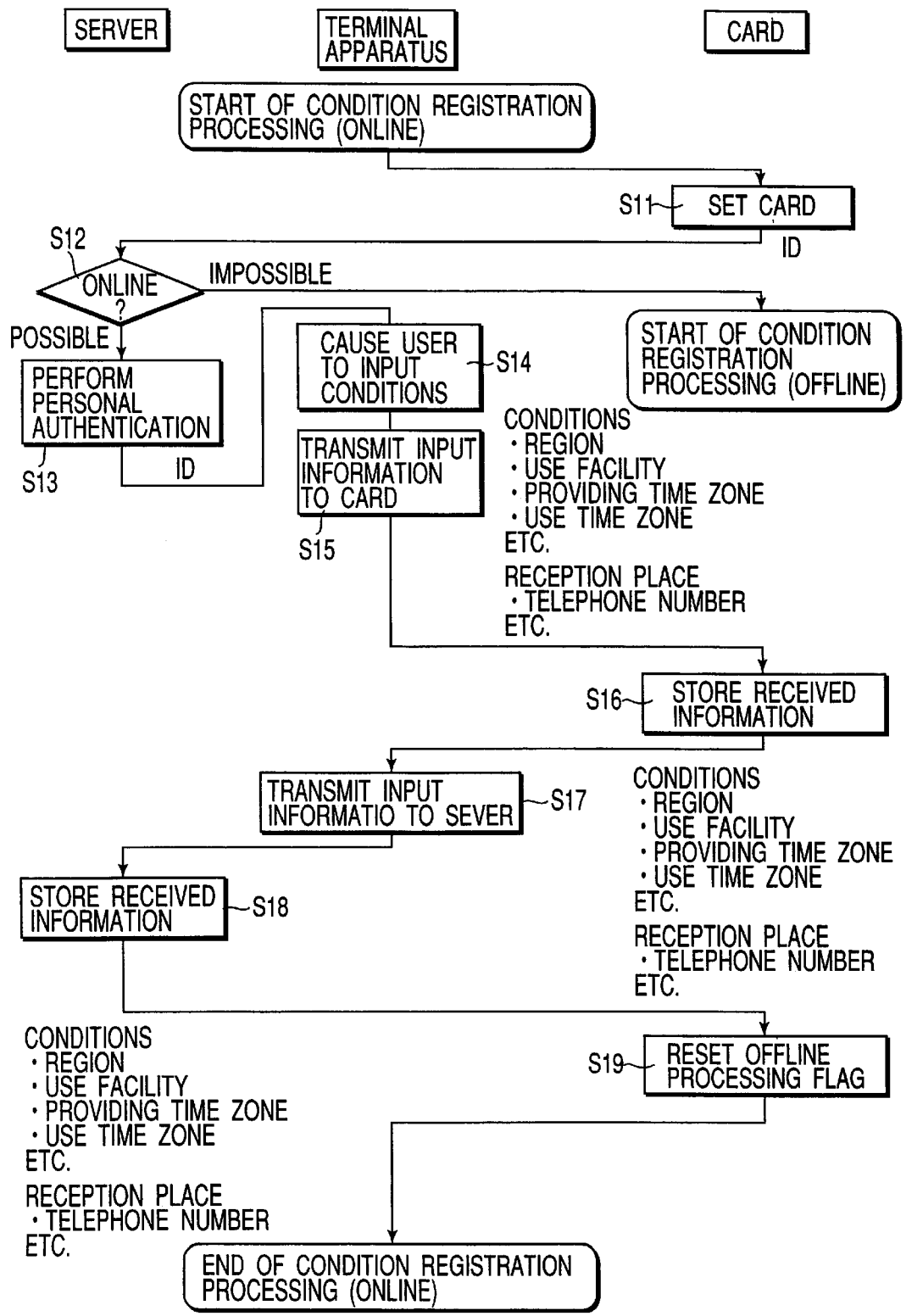
FIG. 22 is a flow chart for explaining a process of performing the condition registering online and the registering of the reception place at the same time.

In the above description, condition registration processing and reception place registration processing are independently executed. However, as shown in FIGS. 21 and 22, reception place registration processing may be executed next to or simultaneously with condition registration processing in online connection. In the example shown in FIG. 21, processing in steps S31 to S37 of FIG. 10 can be omitted. In the example shown in FIG. 22, the reception place can be input and registered together with condition information.

Figure 8:
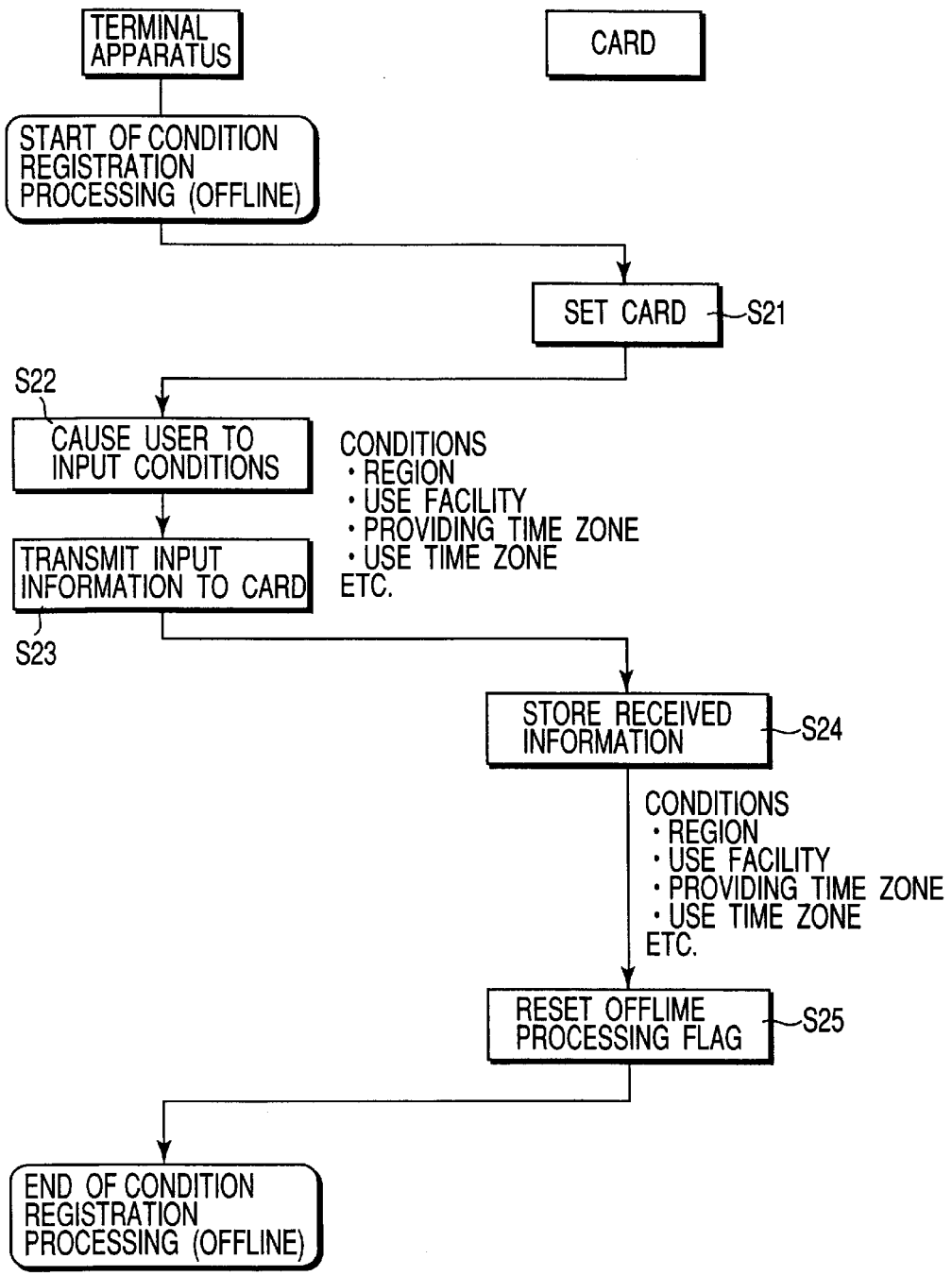
FIG. 8 is a flow chart for explaining condition registration by online processing.

Offline processing will be described next with reference to FIG. 7 that illustrates devices used and the flow chart shown in FIG. 8.

In step S21, the user sets the IC card 8 in the personal computer 3. Next, the user inputs, through the personal computer 3, conditions for service information wanted by the user, e.g., a use region where the service information is to be used, a use facility such as an amusement park, zoo, and restaurant, a providing time zone when the user will receive the service information, and a use time zone when the user will use the facility (S22).

The personal computer 3 transmits the pieces of input condition information to the IC card 8 set therein (S23), stores the information in, e.g., the IC card 8 (S24), as shown in FIG. 5, and sets the offline processing flag in the IC card 8 (S25).

The condition registration by offline processing is ended in the above way.

Figure 4:
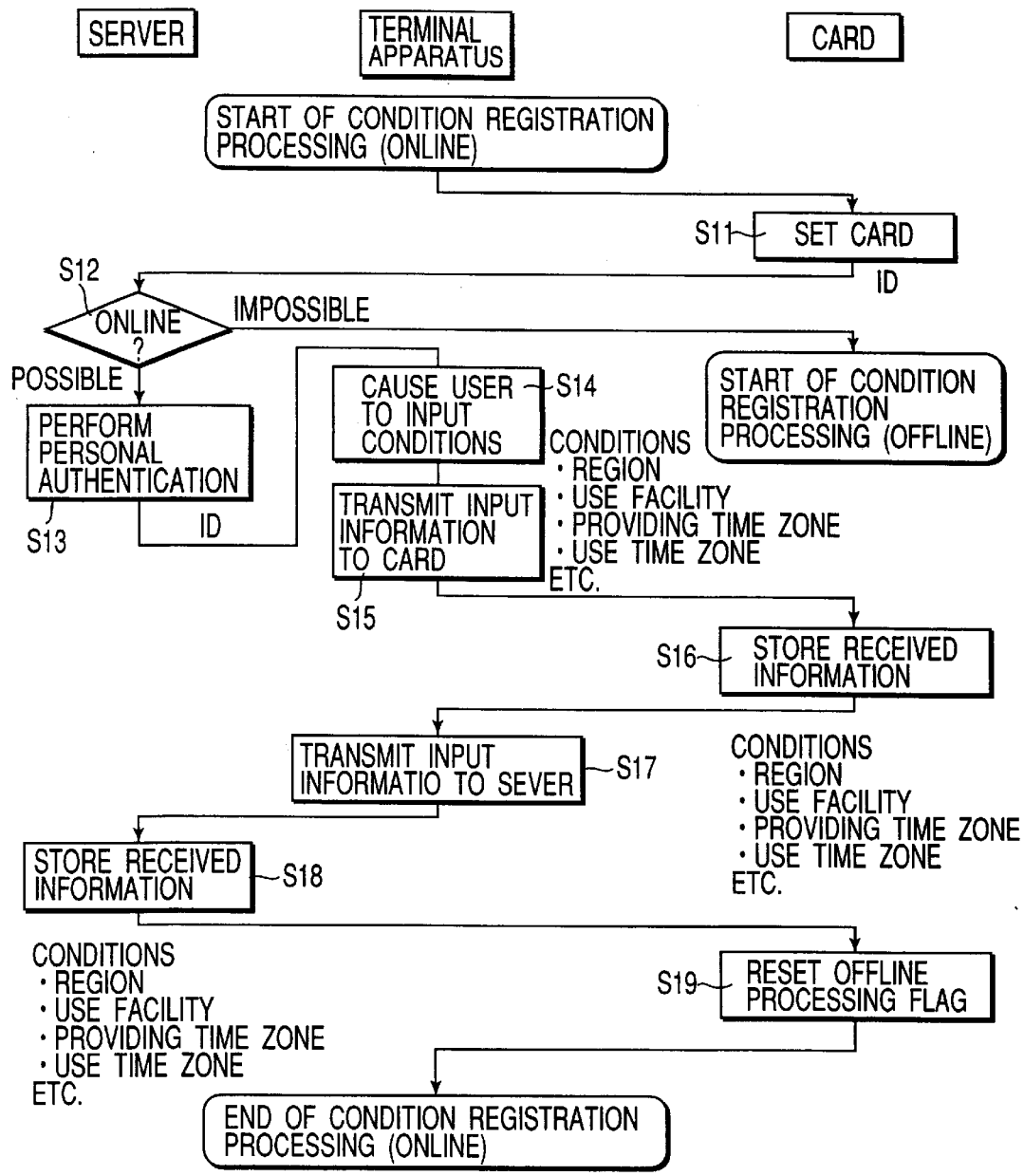
FIG. 4 is a flow chart for explaining condition registration by online processing.

When the IC card 8 in which the conditions are registered by offline processing and the offline processing flag is set is set in the personal computer 3, referring to FIG. 4, steps S14 to S16 are omitted, and instead, the pieces of condition information stored in the IC card 8 are read out and transmitted to the information providing server 12 in step S17, and the offline processing flag in the IC card 8 is reset (S19).

Figure 9:
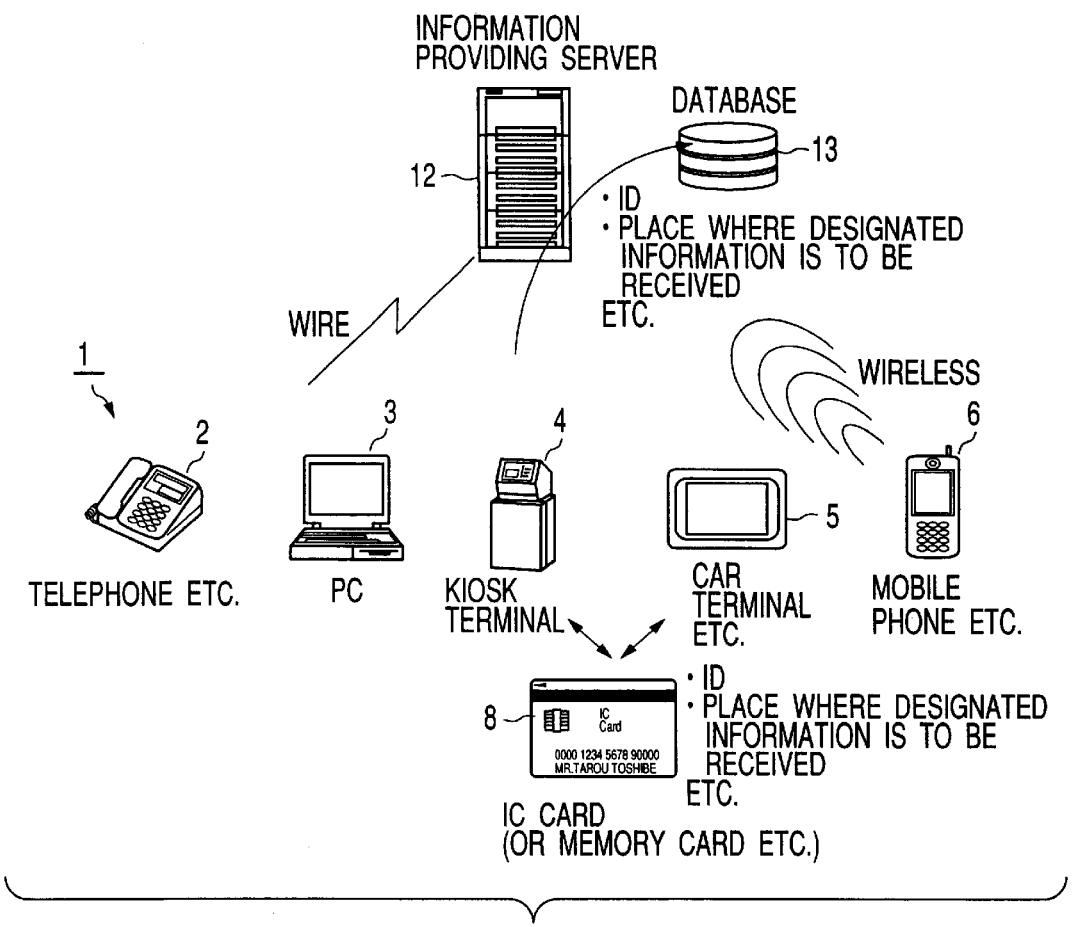
FIG. 9 is a view showing devices used for reception place registration.
Figure 10:
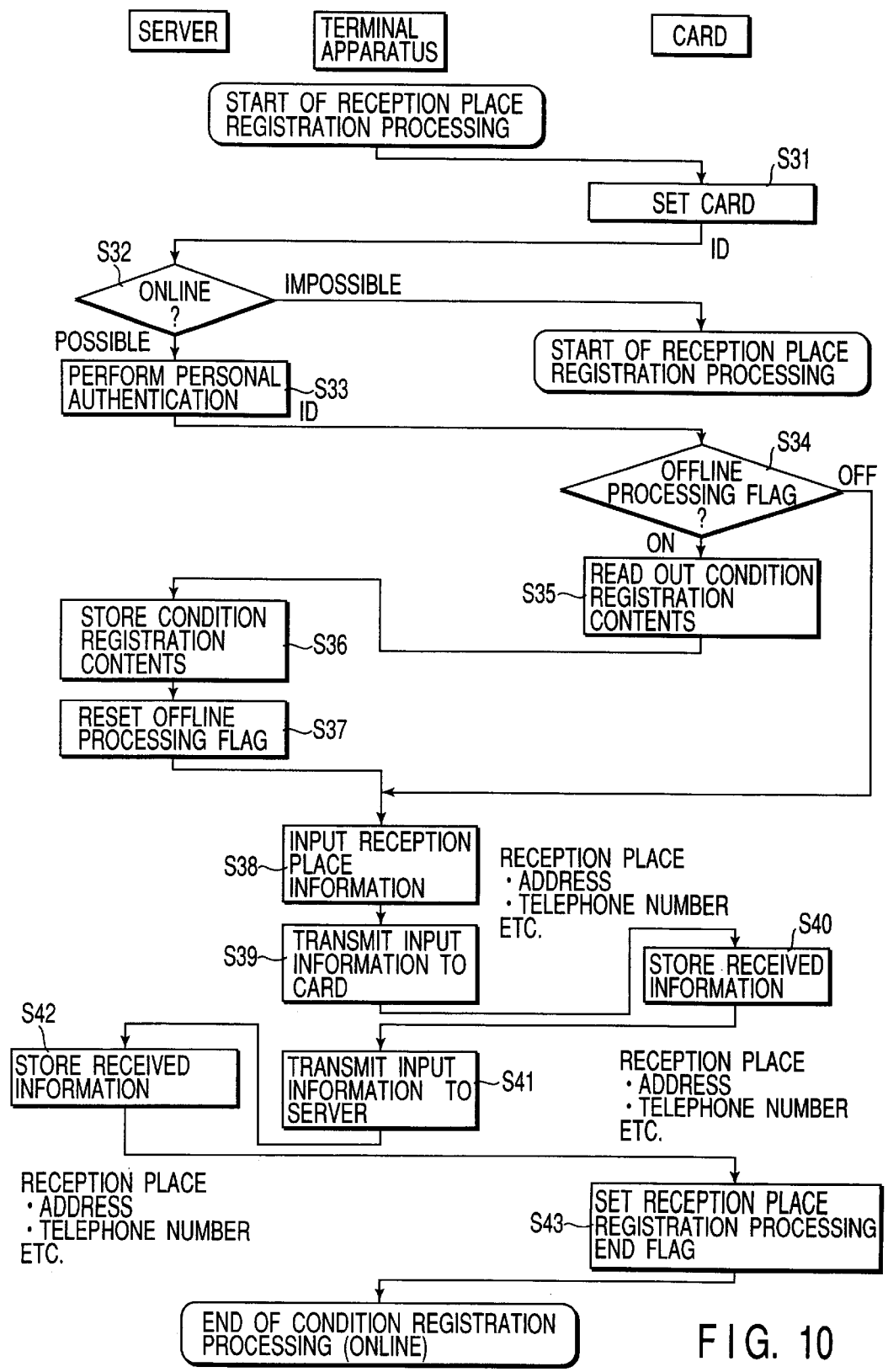
FIG. 10 is a flow chart for explaining registration of a reception place.

Reception place registration in step S2 will be described with reference to FIG. 9 that illustrates devices used and the flow chart shown in FIG. 10. Reception place registration using the personal computer 3 at home as one of the various terminal apparatuses 1 will be described. This also applies to processing using another terminal apparatus.

In step S31, the user sets the IC card 8 in the personal computer 3. When the IC card 8 is set, the ID number is read out from the IC card 8 and transmitted to the information providing server 12. If online processing is impossible because, e.g., the information providing server 12 is not in operation (S32), the flow returns to step S31.

When online processing is possible (S32), the information providing server 12 receives the ID number from the personal computer 3 and performs personal authentication on the basis of, e.g., whether the ID number is registered, i.e., the user is registered as a member who can use the system (S33).

When personal authentication in the information providing server 12 is ended, the personal computer 3 checks whether the offline processing flag in the set IC card 8 is set (ON) or reset (OFF) (S34). If the offline processing flag is set (ON), the conditions are registered by offline processing, so the contents of condition registration are read out from the IC card 8 (S35) and transmitted to the information providing server 12.

The information providing server 12 stores the contents of condition registration from the personal computer 3 in the database 13 (S36) and resets the offline processing flag in the IC card 8 (S37). The flow advances to step S38. If it is determined in step S34 that the offline processing flag is reset (OFF), the conditions are registered by online processing, so the flow skips steps S35 to S37 and advances to step S38.

In step S38, the user inputs, through the personal computer 3, the address and telephone number of the receiving terminal apparatus as a place where the user will receive the desired service information, i.e., reception place information (S38). The personal computer 3 transmits the input reception place information to the IC card 8 set therein (S39) and stores the information in, e.g., the IC card 8 (S40), as shown in FIG. 5, and also transmits the information to the information providing server 12 (S41).

The information providing server 12 stores the reception place information from the personal computer 3 in, e.g., the database 13 (S42), as shown in FIG. 6, and sets a reception place registration processing end flag in the IC card 8 through the personal computer 3 (S43).

The reception place registration processing is ended in the above way.

Figure 11:
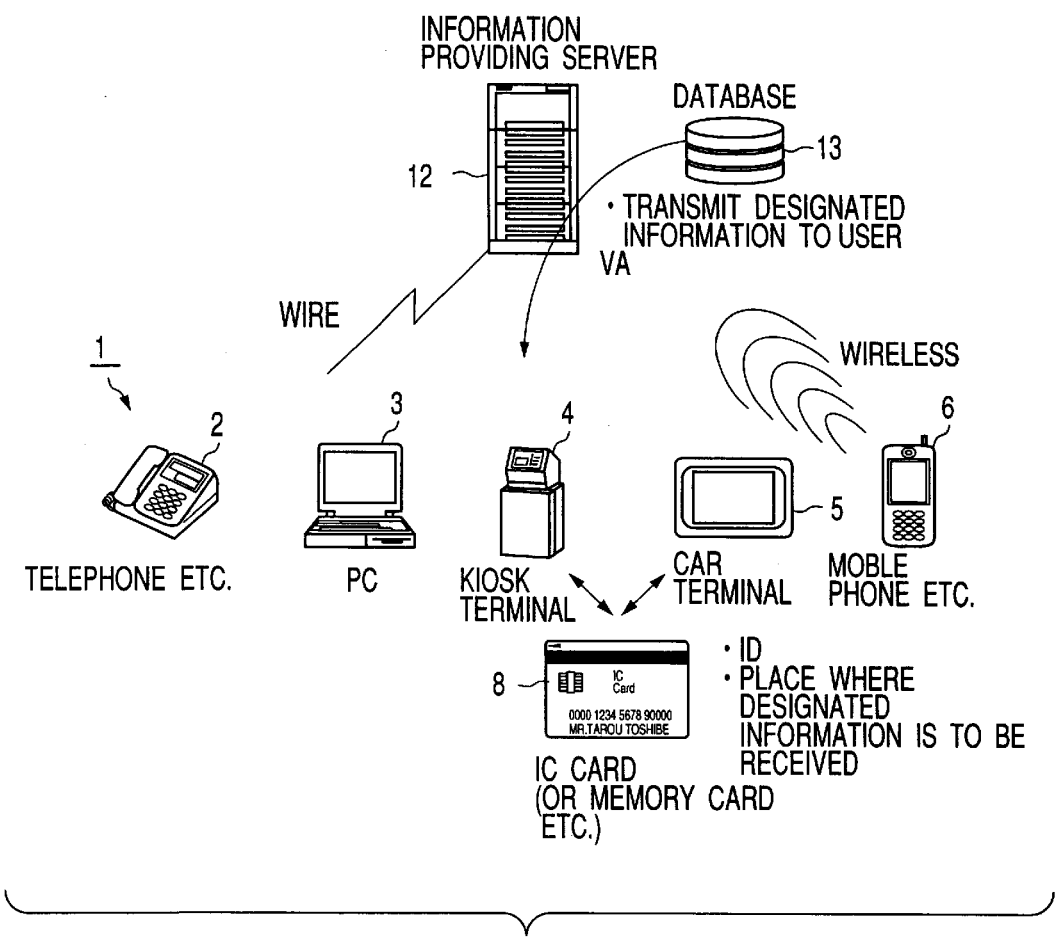
FIG. 11 is a view showing devices used for information providing.
Figure 12:
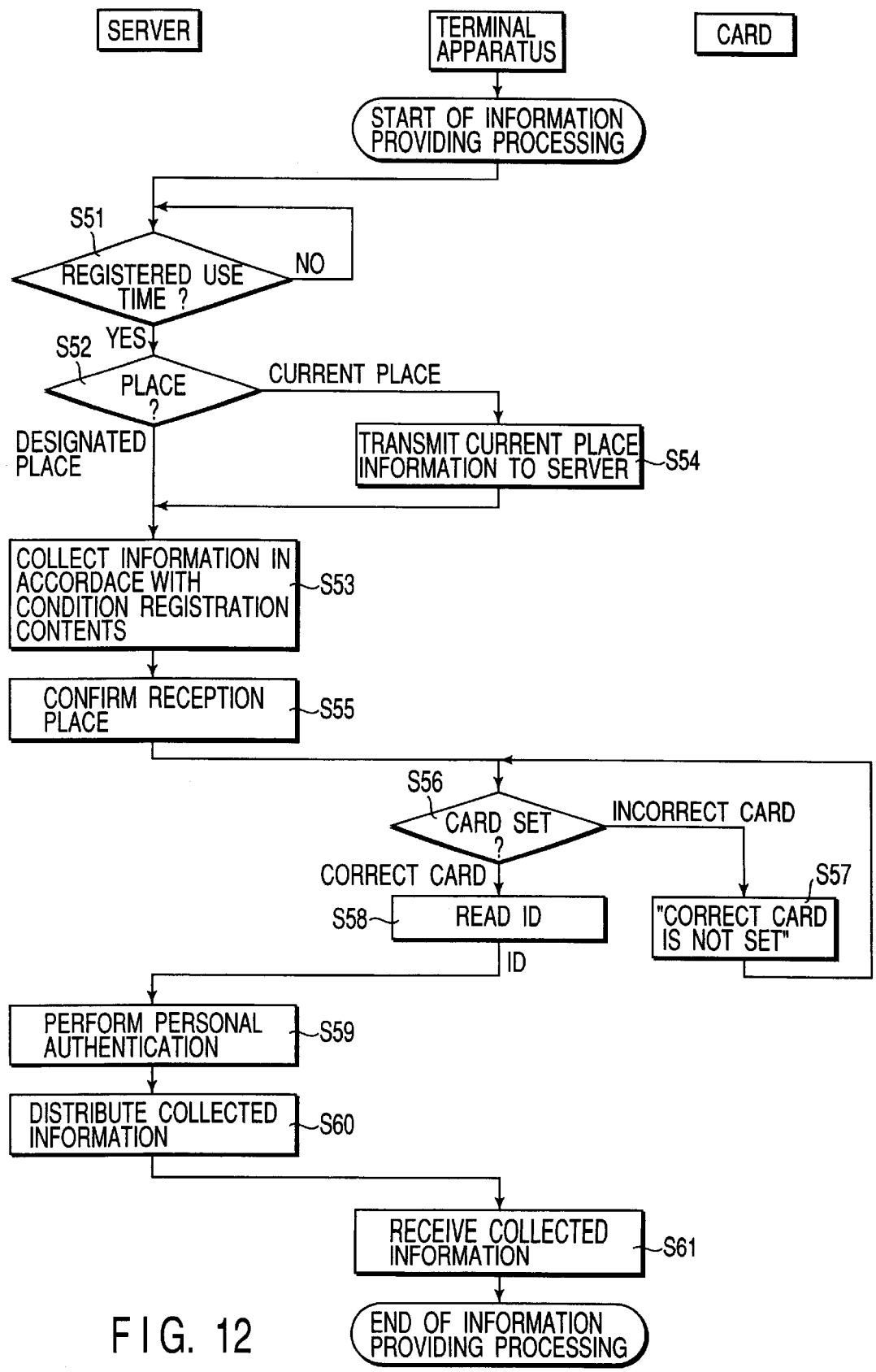
FIG. 12 is a flow chart for explaining information providing.
Figure 13:
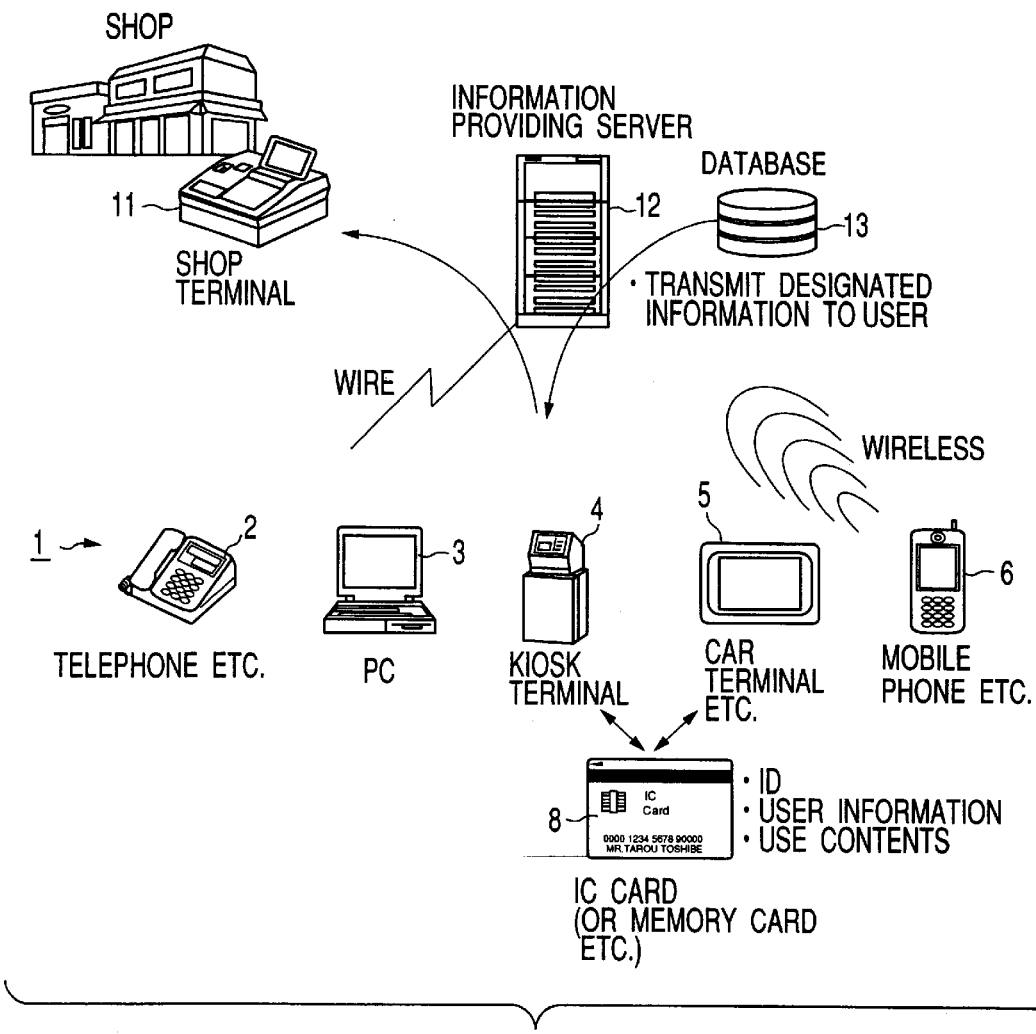
FIG. 13 is a view showing devices used for information utilization.

Information search and providing in steps S3 and S4 will be described next with reference to FIG. 11 that illustrates devices used and the flow chart shown in FIG. 12. Information search/providing using the car terminal 5 as one of the various terminal apparatuses 1 will be described. This also applies to processing using another terminal apparatus.

In step S51, the information providing server 12 checks whether the use time zone registered in advance comes. If YES in step S51, it is checked whether the reception place is designated (S52). If YES in step S52, the database 13 is searched in accordance with the contents of registered conditions, thereby acquiring (collecting) designated service information (S53).

If NO in step S52, the information providing server 12 notifies the car terminal 5 of it. Upon receiving this notification, the car terminal 5 acquires the current place (current position) information using the navigation function and transmits the current place information to the information providing server 12 (S54). The information providing server 12 receives the information and executes the above-described processing in step S53.

In step S56, the information providing server 12 checks whether the correct IC card 8 is set in the IC card 8. If NO in step S55, a message "correct card is not set" is displayed on the display of the car terminal 5 (S57) to prompt the user to set the correct IC card 8, and the flow returns to step S56.

If YES in step S56, the information providing server 12 reads out the ID number from the IC card 8 through the car terminal 5 (S58) and performs personal authentication on the basis of, e.g., whether the ID number is registered, i.e., the user is registered as a member who can use the system (S59).

Next, when the personal certification in step S59 determines that the ID number is one registered as a member who can use the system, the information providing server 12 transmits the designated, acquired (collected) service information to the car terminal 5 (S60). The car terminal 5 receives the service information from the information providing server 12 (S61), and the processing is ended.

Information utilization in step S5 will be described next with reference to FIG. 3 that illustrates devices used, the guide windows shown in FIGS. 14A to 14D, and the flow chart shown in FIG. 15. Information utilization using the car terminal 5 as one of the various terminal apparatuses 1 will be described. This also applies to processing using another terminal apparatus.

The car terminal 5 sequentially displays, on its display, menu windows as shown in FIGS. 14A to 14D, which are provided from the information providing server 12. More specifically, when the user requests restaurant information, the restaurant menu window shown in FIG. 14A is displayed first. When the user selects, e.g., "restaurant A", the information window for the restaurant A as shown in FIG. 14B is displayed. When the user selects, e.g., item "detailed information display", the detailed information window for the restaurant A as shown in FIG. 14C is displayed. On this menu, the user can request, e.g., the menu or a map around the restaurant A and use it.

Figure 15:
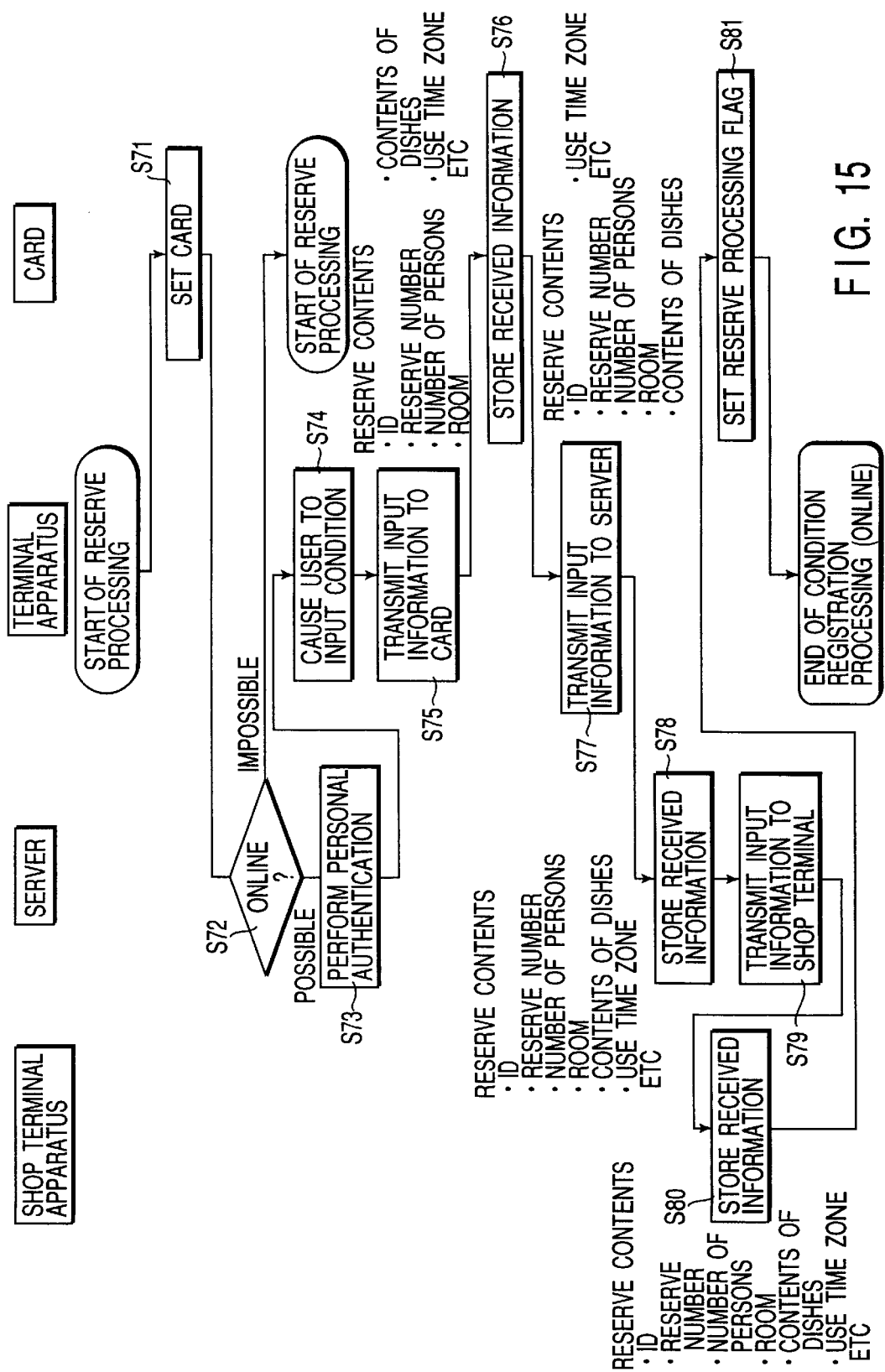
FIG. 15 is a flow chart for explaining reserve processing.
Figure 16:
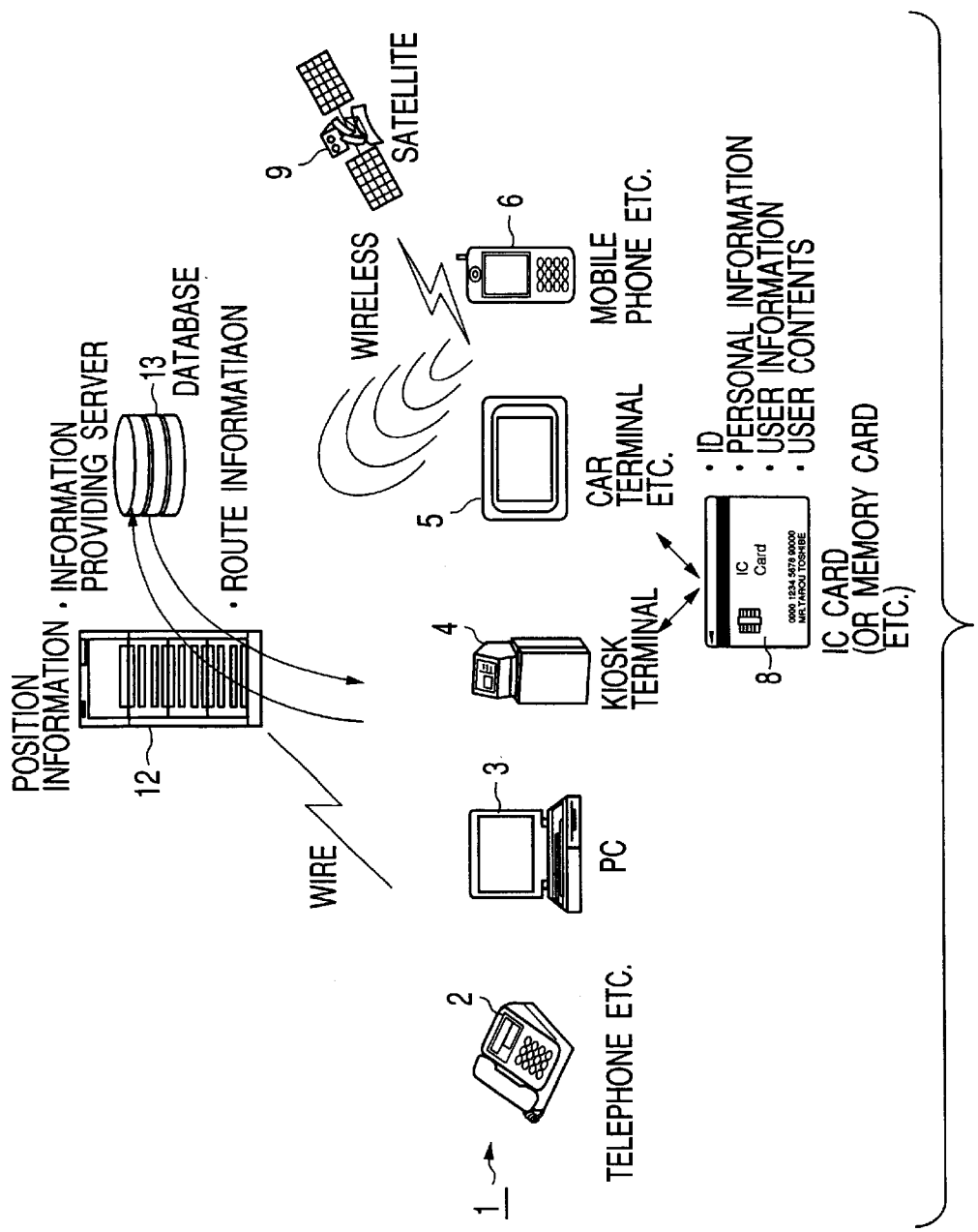
FIG. 16 is a view showing devices used for optimum route information providing.

When the user selects item "reserve" on the information window for the restaurant A shown in FIG. 14B, reserve processing for the restaurant is executed in accordance with, e.g., the flow chart shown in FIG. 15.

In step S71, the user sets the IC card 8 in the car terminal 5. When the IC card 8 is set, the car terminal 5 reads out, from the IC card 8, the ID number stored in the IC card 8 and transmits the readout ID The reserve processing is ended in the above way.

Optimum route information providing in step S6 will be described with reference to the guide windows shown in FIGS. 14A to 14D and FIG. 16 that illustrates devices used. Note that providing of optimum route information is executed in association with the above-described reserve processing.

For example, when a restaurant is reserved, as described above, the window returns to the detailed information window for the restaurant A shown in FIG. 14C again, and the user selects item "optimum route" on this window. When item "optimum route" is selected, the car terminal 5 obtains an optimum route from the current position to the reserved "restaurant A" using the navigation function and displays the obtained optimum route on the display, as shown in FIG. 14D. Referring to FIG. 14D, symbol a represents the current position, and b represents the restaurant A. The user can go to the "restaurant A" as the destination while looking at this display window.

The optimum route information providing processing is ended in the above way.

Figure 17:
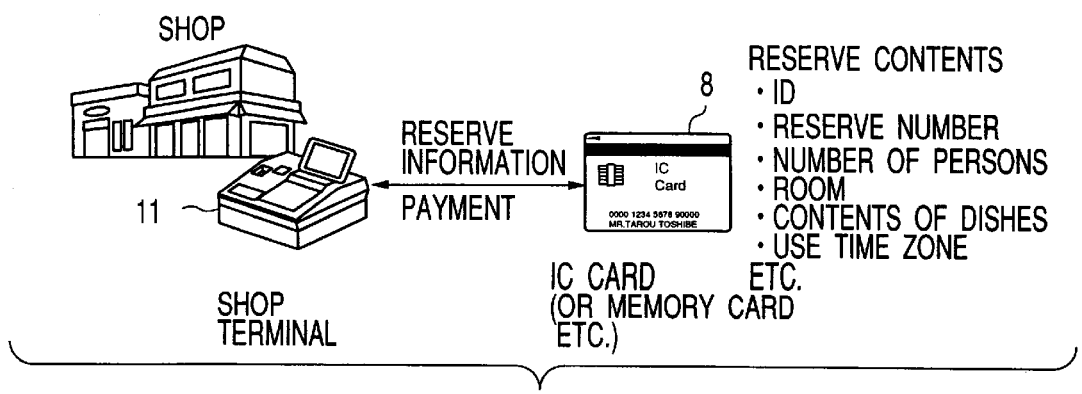
FIG. 17 is a view showing devices used for reserve confirmation/payment.
Figure 18:
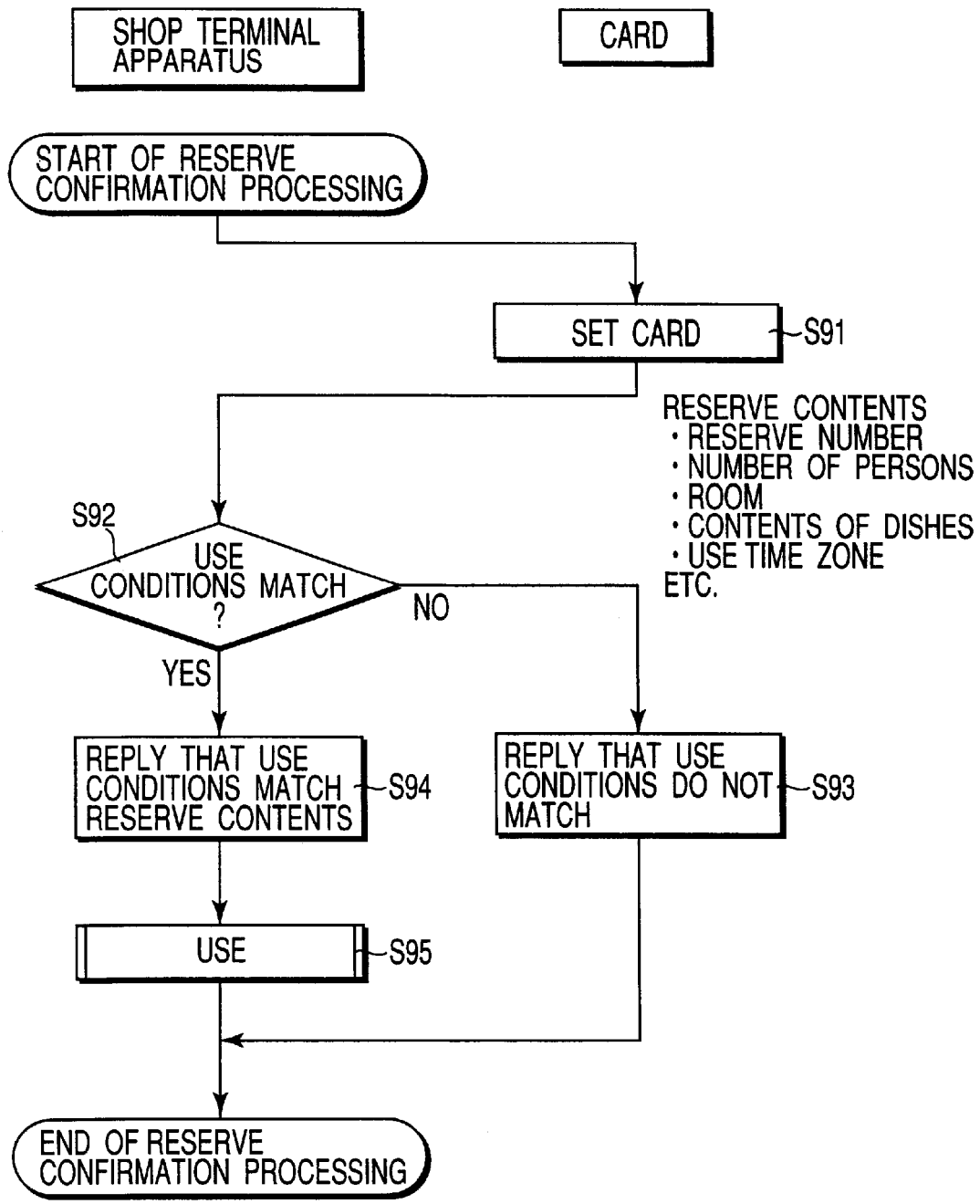
FIG. 18 is a flow chart for explaining reserve confirmation.

Reserve confirmation in step S7 will be described next with reference to FIG. 17 that illustrates devices used and the flow chart shown in FIG. 18.

When the user arrives at the reserved use facility ("restaurant A" in the above example), the use facility number to the information providing server 12. If online processing is impossible because, e.g., the information providing server 12 is not in operation (S72), the flow returns to step S71.

If online processing is possible (S72), the information providing server 12 receives the ID number from the car terminal 5 and performs personal authentication on the basis of, e.g., whether the ID number is registered, i.e., the user is registered as a member who can use the system (S73).

The user inputs, through the car terminal 5, e.g., the ID number, reserve number, number of persons, room, contents of dishes, and use time zone as reserve contents (S74). The car terminal 5 transmits the input reserve contents to the IC card 8 set therein (S75) and stores them in the IC card 8 (S76) and also transmits the reserve contents to the information providing server 12 (S77).

The information providing server 12 stores the reserve contents from the car terminal 5 in the database 13 (S78) and transmits them to the shop terminal apparatus 11 in the reserved shop (restaurant) (S79). The shop terminal apparatus 11 stores the reserve contents from the information providing server 12 (S80) and also sets a reserve processing flag in the IC card 8, which represents that the reserve processing has been executed, through the car terminal 5 (S81). confirms the reserve contents. First, in step S91, the IC card 8 of the user is set in the shop terminal apparatus 11. When the IC card 8 is set, the shop terminal apparatus 11 reads out, from the IC card 8, the reserve contents (ID number, reserve number, number of persons, room, contents of dishes, use time zone, and the like) stored in the IC card 8 and collates them with corresponding reserve contents stored in advance, thereby checking whether the use conditions match (S92).

If NO in step S92, the shop terminal apparatus 11 displays, on the display, a message representing that the use conditions do not match (S93). A staff notifies the user of it, and the reserve confirmation processing is ended. If YES in step S92, the shop terminal apparatus 11 displays, on the display, a message representing that the use conditions match (S94) and allows the user to use the facility. The staff notifies the user of it, and the user uses the facility (S95).

The reserve confirmation processing is ended in the above way.

Figure 19:
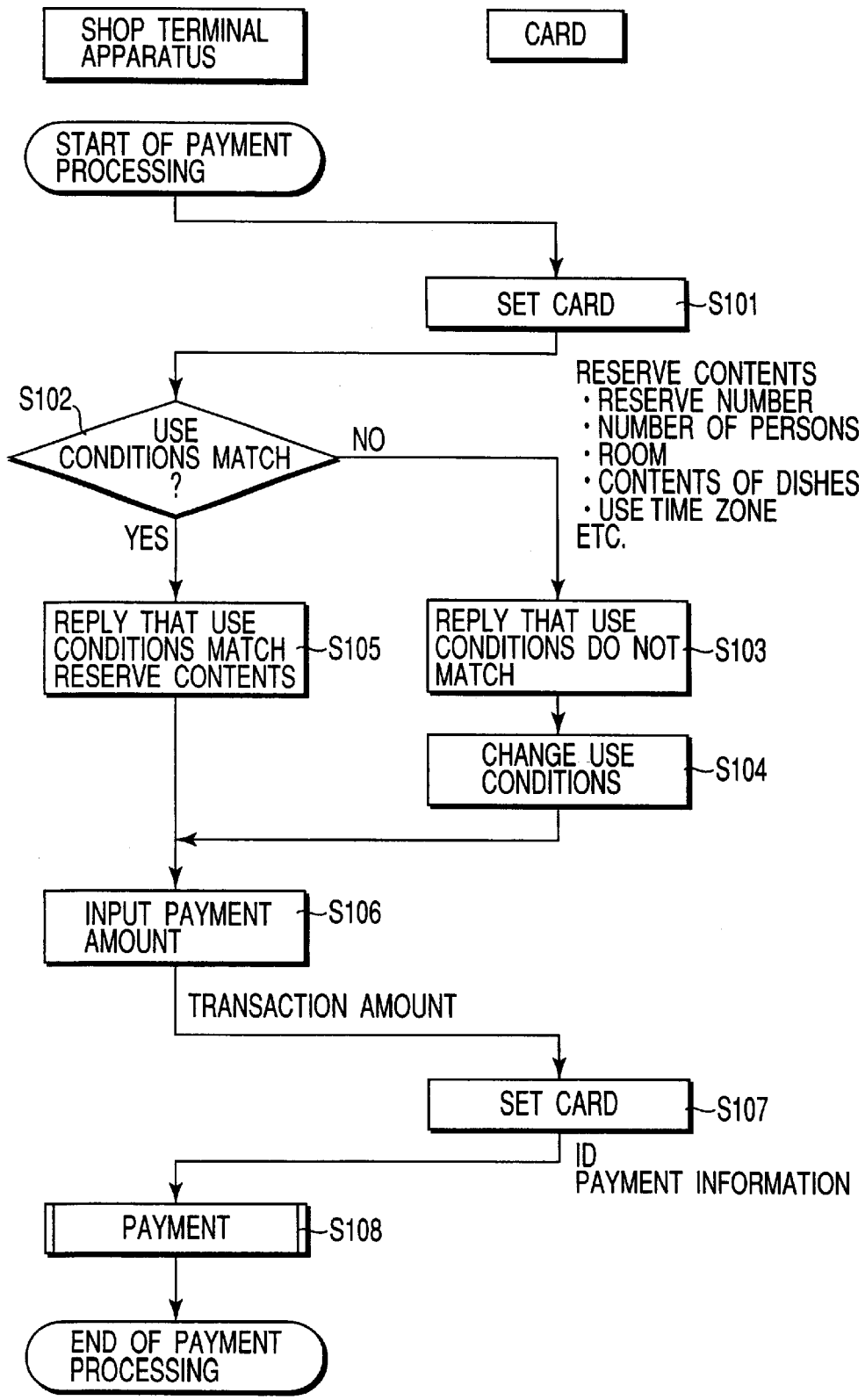
FIG. 19 is a flow chart for explaining payment.

Use charge payment in step S8 will be described next with reference to FIG. 17 that illustrates devices used and the flow chart shown in FIG. 19.

The user uses the facility and then pays the use charge. When the IC card 8 has a payment function, payment is done by the IC card 8. More specifically, in step S101, the IC card 8 of the user is set in the shop terminal apparatus 11. When the IC card 8 is set, the shop terminal apparatus 11 reads out, from the IC card 8, the reserve contents (ID number, reserve number, number of persons, room, contents of dishes, use time zone, and the like) stored in the IC card 8 and collates them with corresponding reserve contents stored in advance, thereby checking whether the use conditions match (S102).

If NO in step S102, the shop terminal apparatus 11 displays, on the display, a message representing that the use conditions do not match (S103). In this case, the use conditions are changed (S104). If YES in step S102, the shop terminal apparatus 11 displays, on the display, a message representing that the use conditions match (S105).

Next, the payable amount (amount of transaction) is input to the shop terminal apparatus 11 (S106). To pay the amount using an IC card different from the IC card 8 set in step S101, the IC card is set in the shop terminal apparatus 11 (S107). To pay the amount using the IC card 8 set in step S101, the processing in step S107 is omitted.

The shop terminal apparatus 11 reads out the ID number and predetermined payment information from the set IC card 8 and executes known payment processing of paying the input payable amount from the account (S108).

The use charge payment processing is ended in the above way.

According to the above-described service information providing system, for example, in a sightseeing tour using a car, the contents of desired service information are registered in advance using a personal computer at home, a street terminal apparatus installed in a service area of a highway, or the like, the contents and the address or telephone number of the information providing server where the contents are registered are registered in an IC card, and the IC card is set in the car terminal when the user rides on the car whereby when and to which car terminal desired service information registered using the IC card should be transmitted is transmitted from the car terminal to the information providing server, and the service information really wanted by the user can be obtained on the basis of the registration information.

The pieces of registration information are stored in the IC card and therefore only need to be transmitted to the information providing server 12 online immediately before the service information is actually received. Hence, the registration information can normally be input by offline processing.

As described above, when service information required by a person is timely provided, both the service receiving side and the service providing side can have advantages, i.e., the service receiving side can obtain effective information, and the service providing side can effectively provide the information.

Since the user registers in advance desired service information and data/time in both the information providing server and the user's IC card and can receive the desired service information at a designated place registered in the IC card, the desired service information can be received anywhere.

Since the IC card can store pieces of information, conditions for desired service information can be registered only in the IC card at home, and the condition registration can be set to the information providing server when the IC card is set in the car terminal or the like.

Consistent services can be provided to the user by integrating condition registration, reception place registration, service information providing, service information utilization, optimum route information providing, and reserve confirmation/payment using the IC card as a key.

As described above in detail, according to the present invention, a service information providing method and system capable of timely providing useful service information really wanted by a user such that both the service receiving side and the service providing side can have advantages, i.e., the service receiving side can obtain effective information, and the service providing side can effectively provide the information can be provided.

According to the present invention, a service information providing method, a service information providing apparatus and system in which a user registers in advance desired service information and date/time in the service providing side and the user's portable electronic device and can receive desired service information at a designated place registered in the portable electronic device can be provided.

According to the present invention, a service information providing method, a service information providing apparatus and system capable of providing consistent services to the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A service information providing method of providing various pieces of service information stored in a host apparatus to a terminal apparatus connected to the host apparatus by a wire or wireless, comprising the steps of:

registering identification information related to the terminal apparatus for receiving the service information in the host apparatus and an electronic device freely detachable from the terminal apparatus;

confirming whether the registered electronic device is set in the terminal apparatus represented by the registered identification information; and when it is confirmed in the confirmation step that the electronic device is set in the terminal apparatus, providing the service information stored in the host apparatus to the terminal apparatus device represented by the registered identification information.

2. A method according to claim 1, wherein the registration step includes the steps of:

determining whether the terminal apparatus in which the electronic device is set for registration can be online-connected to the host apparatus; and when it is determined in the determination step that online connection is possible, storing the identification information in the host apparatus and the electronic device set in the terminal apparatus, and when it is determined in the determination step that online connection is impossible, storing the identification information and information representing offline registration in the electronic device set in the terminal apparatus.

3. A method according to claim 2, wherein the registration step includes the steps of:

when the electronic device is set in the same terminal apparatus as the terminal apparatus represented by the registered identification information or a different terminal apparatus, determining whether the information representing the offline registration is stored in the electronic device;

when it is determined in the determination step that the information representing offline input is stored, reading out the identification information stored in the electronic device; and storing the readout identification information in the host apparatus.

4. A method according to claim 1, wherein the confirming step includes the steps of:

determining whether the terminal apparatus represented in the registered identification information is set with suitable electronic device; and when it is determined in the determination step that the electronic device is set in the terminal apparatus determining whether the set electronic device is one used in the registering step.

5. A method according to claim 1, further comprising the steps of:

when information related to reserve contents about specific information of the service information provided in the providing step is input, reserving/registering the reserve information in the host apparatus and the electronic device set in the terminal apparatus to which the service information is provided; and at a time of use of the reserved/registered reserve information, confirming authenticity of the reserve information by comparing the reserve information stored in the electronic device with the reserve information stored in the host apparatus.

6. A method according to claim 5, wherein the reserve/registration step includes the steps of:
executing authentication processing for the set electronic device; and
when authentication reveals that the electronic device is an authentic device, controlling to execute registration of the reserve information.

7. A method according to claim 5, further comprising the step of executing payment processing for use in accordance with the reserve information stored in the electronic device.

8. A service information providing method in a service information providing apparatus which has storage means for storing various pieces of service information and provides the stored service information to a terminal apparatus connected by a wire or wireless, comprising the steps of:
when first identification information related to terminal apparatus for receiving the service information is input, storing, in the storage means, the first input identification information and second identification information of an electronic device freely detachable from the terminal apparatus;
confirming whether the electronic device represented by the second identification information is set in the terminal apparatus represented by the stored first identification information; and
when it is confirmed in the confirmation step that the electronic device is set in the terminal apparatus, providing the service information stored in the storage means to the terminal apparatus represented by the stored first identification information.

9. A service information providing system for providing various pieces of service information stored in a host apparatus to a terminal apparatus connected to the host apparatus by a wire or wireless, comprising:
input means for inputting identification information related to the terminal apparatus for receiving the service information;
registration means for registering the identification information input by the input means in the host apparatus and an electronic device freely detachable from the terminal apparatus;
determination means for determining whether the registered electronic device is set in the terminal apparatus represented by the identification information registered by the registration means; and
providing means for, when the determination means determines that the electronic device is set in the terminal apparatus, providing the service information stored in the host apparatus to the terminal apparatus represented by the registered identification information.

10. A system according to claim 9, wherein the registration means includes:
online determination means for determining whether the terminal apparatus in which the electronic device is set for registration can be online-connected to the host apparatus;
first control means for, when the online determination means determines that online connection is possible, storing the identification information input by the input means in the host apparatus and the electronic device set in the terminal apparatus; and
second control means for, when the online determination means determines that online connection is impossible, storing the identification information input by the input means and information representing offline registration in the electronic device set in the terminal apparatus.

11. A system according to claim 10, further comprising:
offline determination means for, when the electronic device is set in the same terminal apparatus as the terminal apparatus represented by the registered identification information or a different terminal apparatus, determining whether the information representing the offline registration is stored in the electronic device;
reading means for, when the offline determination means determines that the information representing offline input is stored, reading out the identification information stored in the electronic device; and
third control means for storing the identification information read out by the reading means in the host apparatus.

12. A system according to claim 9, wherein said registration means includes:
first determination means for determining whether an authentic electronic device is set in a terminal apparatus represented by the identification information registered by said registration means; and
second determination means for, when said first determination means determines that the authentic electronic device is set, determining whether the set electronic device is an electronic device used for registration.

13. A system according to claim 9, further comprising:
reserve information input means for inputting information related to reserve contents about specific information of the service information provided by the providing means;
reserve/registration means for reserving/registering the reserve information input by the reserve information input means in the host apparatus and the electronic device set in the terminal apparatus to which the service information is provided; and
confirmation means for, at a time of use of the reserve information reserved/registered by the reserve/registration means, confirming authenticity of the reserve information by comparing the reserve information stored in the electronic device with the reserve information stored in the host apparatus.

14. A system according to claim 13, wherein the reserve/registration means includes:
authentication means for executing authentication processing for the set electronic device at a time of reserve/registration; and
control means for, when authentication by the authentication means reveals that the electronic device is an authentic device, controlling to execute registration of the reserve information.

15. A system according to claim 13, further comprising payment means for executing payment processing for use in accordance with the reserve information stored in the electronic device.

16. A service information providing apparatus which has storage means for storing various pieces of service information and provides the stored service information to a terminal apparatus connected by a wire or wireless, comprising:
storage means for, when first identification information related to the terminal apparatus for receiving the service information is input, storing, in the storage means, the input identification information and second identification information of an electronic device freely detachable from the terminal apparatus held by a user;

determination means for determining whether the electronic device represented by the second identification information is set in the terminal apparatus represented by the first identification information stored by the storage means; and providing means for, when the determination means determines that the electronic device is set in the terminal apparatus, providing the service information stored in the storage means to the terminal apparatus represented by the stored first identification information.

* * * * *